(12) United States Patent
Venkatramani et al.

(10) Patent No.: US 8,397,010 B1
(45) Date of Patent: Mar. 12, 2013

(54) CONVENIENT, FLEXIBLE, AND EFFICIENT MANAGEMENT OF MEMORY SPACE AND BANDWIDTH

(75) Inventors: Anjan Venkatramani, Los Altos, CA (US); Srinivas Perla, San Jose, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 499 days.

(21) Appl. No.: 11/829,630

(22) Filed: Jul. 27, 2007

Related U.S. Application Data

(60) Provisional application No. 60/911,974, filed on Apr. 16, 2007.

(51) Int. Cl.
   *G06F 12/06* (2006.01)
(52) U.S. Cl. ............ 711/5; 711/150; 711/151; 711/202; 711/E12.079
(58) Field of Classification Search .............. 711/5, 216, 711/E12.06, E12.066, E12.079; 345/573
See application file for complete search history.

(56) References Cited

U.S. PATENT DOCUMENTS

| | | | | |
|---|---|---|---|---|
| 3,639,682 A * | 2/1972 | Benmussa et al. ................. | 178/3 |
| 5,214,769 A * | 5/1993 | Uchida et al. ................... | 711/151 |
| 5,390,308 A * | 2/1995 | Ware et al. ......................... | 711/5 |
| 5,509,136 A * | 4/1996 | Korekata et al. .............. | 711/151 |
| 5,630,098 A * | 5/1997 | Vermeer et al. ................ | 711/172 |
| 5,749,085 A * | 5/1998 | Quillevere et al. ................. | 711/5 |
| 6,108,745 A * | 8/2000 | Gupta et al. ...................... | 711/3 |
| 6,154,826 A * | 11/2000 | Wulf et al. ..................... | 711/217 |
| 6,546,453 B1 * | 4/2003 | Kessler et al. ..................... | 711/5 |
| 6,553,478 B1 * | 4/2003 | Grossier ....................... | 711/209 |
| 6,578,117 B2 * | 6/2003 | Weber ........................... | 711/151 |
| 6,604,166 B1 * | 8/2003 | Jana et al. .......................... | 711/5 |
| 7,398,362 B1 * | 7/2008 | Tischler ........................ | 711/157 |
| 7,688,324 B1 * | 3/2010 | Auld et al. ..................... | 345/531 |
| 8,108,625 B1 * | 1/2012 | Coon et al. .................... | 711/150 |
| 2003/0115403 A1 * | 6/2003 | Bouchard et al. ................. | 711/5 |
| 2004/0015633 A1 * | 1/2004 | Smith ........................... | 710/305 |
| 2005/0132146 A1 * | 6/2005 | Kim et al. ..................... | 711/151 |
| 2007/0136536 A1 * | 6/2007 | Byun et al. .................... | 711/149 |

OTHER PUBLICATIONS

Zhao Zhang, Zhichun Zhu, and Xiaodong Zhang. "Breaking Address Mapping Symmetry at Multi-levels of Memory Hierarchy to Reduce DRAM Row-buffer Conflicts." 2002. Journal of Instruction-Level Parallelism. vol. 3.*
Jun Shao and Brian T. Davis. "The Bit-reversal SDRAM Address Mapping." 2005. ACM. SCOPES '05.*
Wei-fen Lin, Steven K. Reinhardt, and Doug Burger. "Reducing DRAM Latencies with an Integrated Memory Hierarchy Design." Jan. 2001. IEEE. HPCA '01.*

* cited by examiner

*Primary Examiner* — Nathan Sadler
(74) *Attorney, Agent, or Firm* — Harrity & Harrity, LLP

(57) ABSTRACT

A device may receive a request to read data from or write data to a memory that includes a number of memory banks. The request may include an address. The device may perform a mapping operation on the address to map the address from a first address space to a second address space, identify one of the memory banks based on the address in the second address space, and send the request to the identified memory bank.

20 Claims, 17 Drawing Sheets

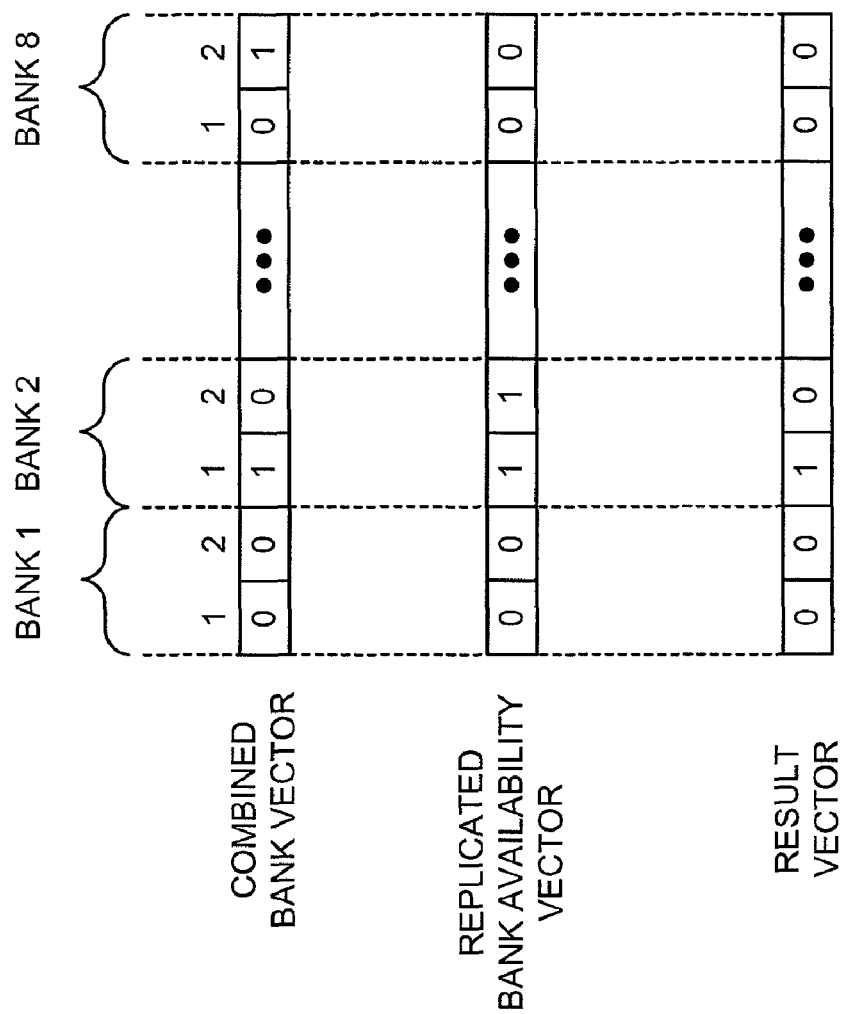

US 8,397,010 B1

CONVENIENT, FLEXIBLE, AND EFFICIENT MANAGEMENT OF MEMORY SPACE AND BANDWIDTH

RELATED APPLICATION

This application claims priority from U.S. Provisional Application No. 60/911,974, filed Apr. 16, 2007, entitled "MEMORY SCHEMES," the content of which is hereby incorporated by reference.

BACKGROUND

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. These routers not only handle higher line rates and higher network traffic volume, but they also add functionality without compromising line rate performance.

SUMMARY

According to one aspect, a data processing device may include a number of requestors, a memory, and a control block. The requestors may issue requests. The memory may include a number of memory banks, where each of the memory banks may be assigned to one of the requestors. The control block may receive a request from one of the requestors, where the request may include an address. The control block may perform a mapping operation on the address to map the address from a first address space to a second address space, identify one of the memory banks based on the address in the second address space, and send the request to the identified memory bank.

According to another aspect, a data processing device may include a number of requestors, a memory, and a control block. The requestors may issue requests. The memory may include a number of memory parts that store a replicated set of data accessible to the requestors. At least one of the memory parts may include a number of memory banks. The control block may receive a request from one of the requestors, where the request may include an address. The control block may also map a first set of bits of the address to a second set of bits of the address to form a modified address, identify one of the memory banks based on the modified address, and send the request to the identified memory bank in one of the memory parts.

According to a further aspect, a method may include receiving a request to read data from or write data to a memory that includes a number of memory banks, where the request may include an address; performing a mapping operation on the address to map the address from a first address space to a second address space; identifying one of the memory banks based on the address in the second address space; and sending the request to the identified memory bank.

According to another aspect, a data processing device may include a memory and a control block. The memory may include a number of memory banks. The control block may be programmed to operate in a first mode or a second mode. In the first mode, the control block may be configured to receive a first request that includes a first address, identify a first one of the memory banks based on the first address, and send the first request to the first memory bank. In the second mode, the control block may be configured to receive a second request that includes a second address, map a first bit of the second address to a second bit of the second address to form a modified address, identify a second one of the memory banks based on the modified address, and send the second request to the second memory bank.

According to a further aspect, a device may include means for receiving a request intended for a memory, where the memory may include a number of memory banks, and the request may include an address; means for swapping a high order bit of the address with a low order bit of the address to form a modified address; means for identifying one of the memory banks based on the modified address; and means for sending the request to the identified memory bank.

BRIEF DESCRIPTION OF THE DRAWINGS

The accompanying drawings, which are incorporated in and constitute a part of this specification, illustrate one or more implementations described herein and, together with the description, explain aspects of these implementations. In the drawings:

FIG. 9 is a diagram of an exemplary result vector;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein provide techniques for providing flexible or hard partitioning of bandwidth of a memory device. In the description to follow, the memory device will be described as a control memory of a network device that stores data structures for use in processing packets. In other implementations, the memory device may be included in another type of data processing device and may store other types of data.

Exemplary Data Processing Device

Figure 1:
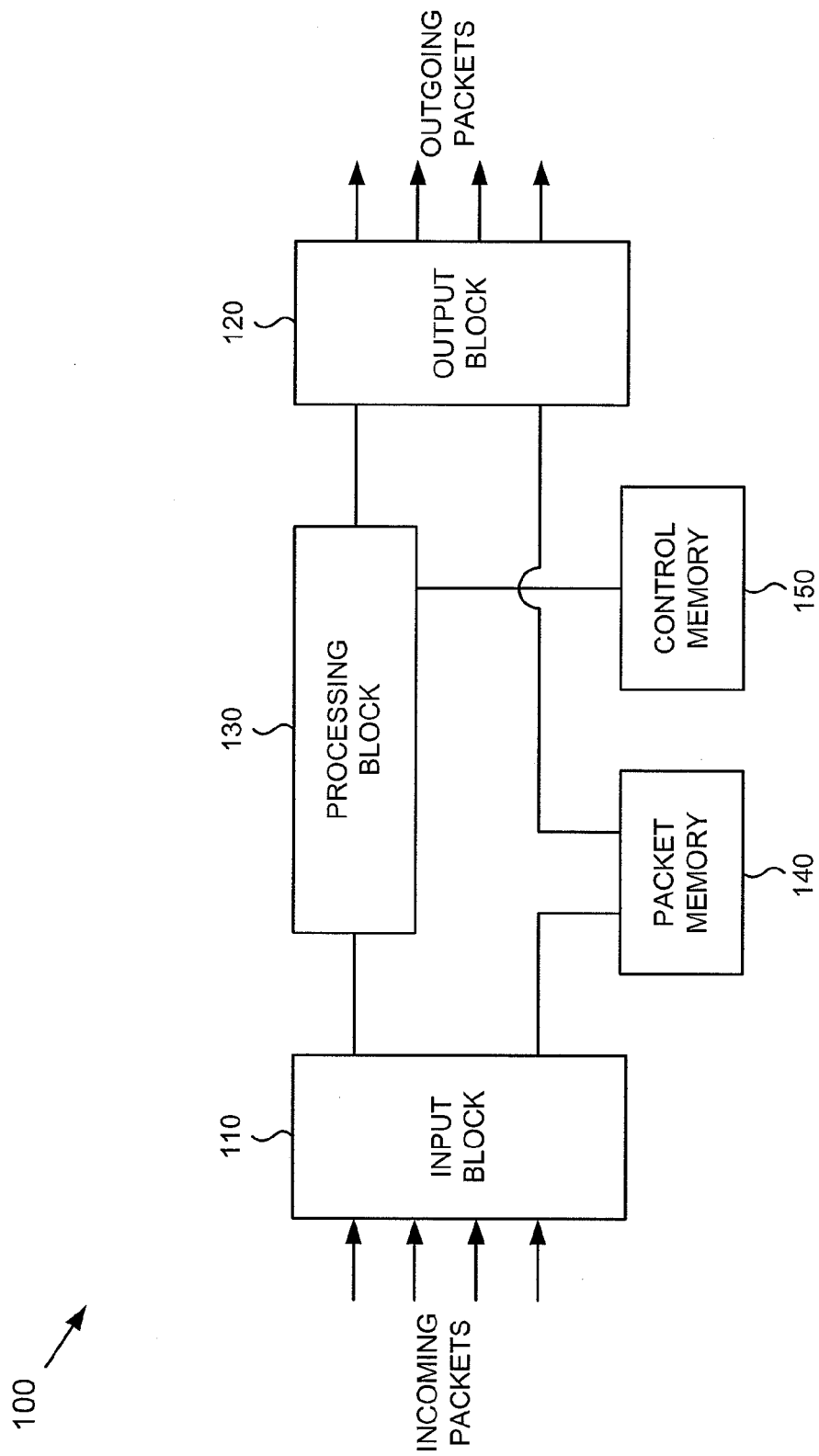
FIG. 1 is a diagram of an exemplary data processing device in which systems and methods described herein may be implemented.

FIG. 1 is a diagram of an exemplary data processing device 100 in which systems and methods described herein may be implemented. Device 100 may include an input block 110, an output block 120, a processing block 130, a packet memory 140, and a control memory 150.

Input block 110 may include one or more input units (e.g., input line cards) that may receive packets on ingress links and perform initial processing on the packets. In one implementation, the initial processing may include analyzing a packet to identify its control information and its packet data (e.g., payload). The control information may include information from the header of the packet, and the packet data may include information from a payload of the packet. In one implementation, the control information may include a source address and/or a destination address from a header of a packet. In another implementation, the control information may include a source address, a destination address, priority information, and/or other information from a header of the packet. Output block 120 may include one or more output units (e.g., output line cards) that may receive packet information from processing block 130 and/or packet memory 140, construct packets from the packet information, and output the packets on egress links.

Processing block 130 may include processing logic that may perform routing functions and handle packet transfers between input block 110 and output block 120. Processing block 130 may receive the control information from input block 110 and process the control information based on data structures stored in control memory 150. When processing the control information, processing block 130 may make certain requests to control memory 150 to read and/or write data.

Figure 2:
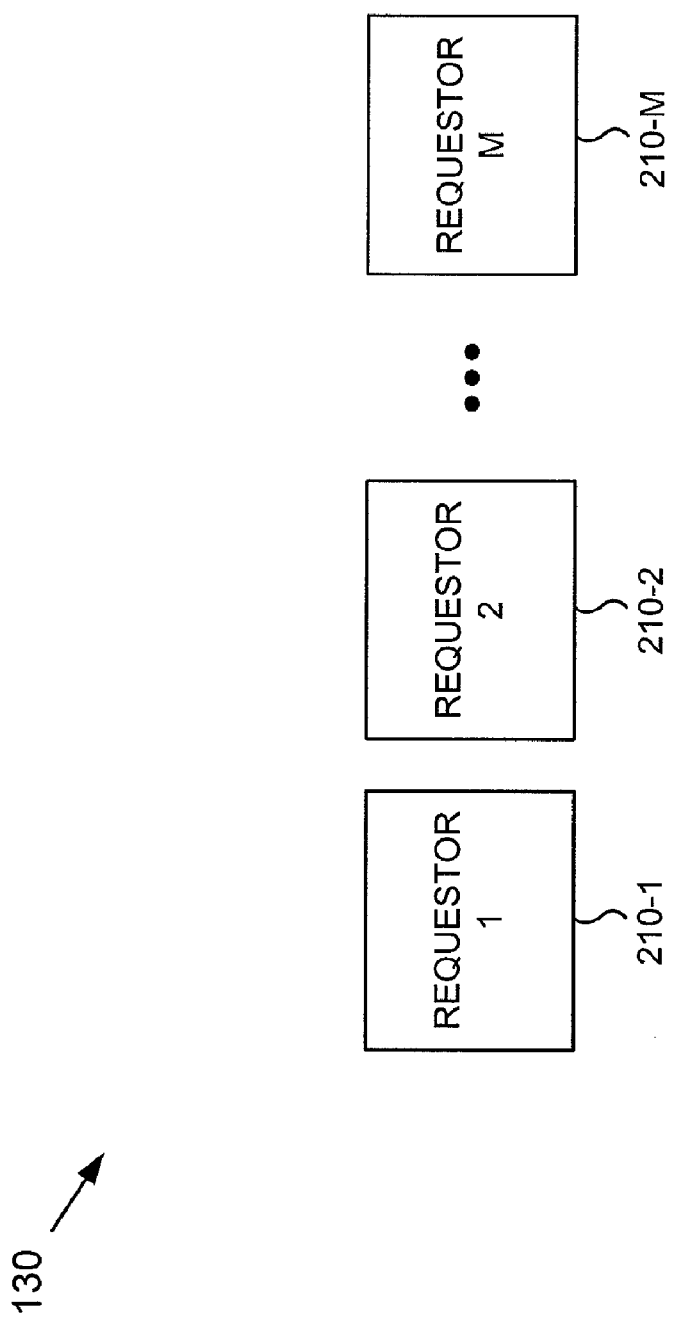
FIG. 2 is a diagram of an exemplary portion of the processing block of FIG. 1.

FIG. 2 is a diagram of an exemplary portion of processing block 130. Processing block 130 may include multiple requestors 210-1, 210-2, . . . , 210-M (where M>1) (collectively referred to herein as "requestors 210"). Requestors 210 may operate independently of each other and/or in parallel. Each of requestors 210 may include processing logic to process control information associated with a particular packet. Each of requestors 210 may make requests to control memory 150 to read and/or write data to assist in the processing of the control information. In one implementation, a requestor 210 may determine how to forward a packet (e.g., determine on which egress link the packet should be transmitted), collect particular statistics regarding the packet, and/or perform one or more management functions with regard to the packet.

Returning to FIG. 1, packet memory 140 may include a memory device, such as a dynamic random access memory (DRAM). Packet memory 140 may store packet data associated with packets received by input block 110. In one implementation, packet memory 140 may store the packet data as a variable length data unit. In another implementation, packet memory 140 may store the packet data as fixed length data units. In this case, the packet data may be divided into one or more of the data units of the fixed length and stored in contiguous or non-contiguous locations in packet memory 140. If stored in non-contiguous locations, data structures, such as linked lists, may be used to identify the data units associated with a particular packet.

Control memory 150 may include a memory device, such as a DRAM, or a reduced-latency DRAM (RLDRAM). Control memory 150 may store data structures to assist in the processing of packets. In one implementation, the data structures might include a routing table, a forwarding table, statistics, and/or management data (e.g., quality of service (QoS) parameters).

Figure 3:
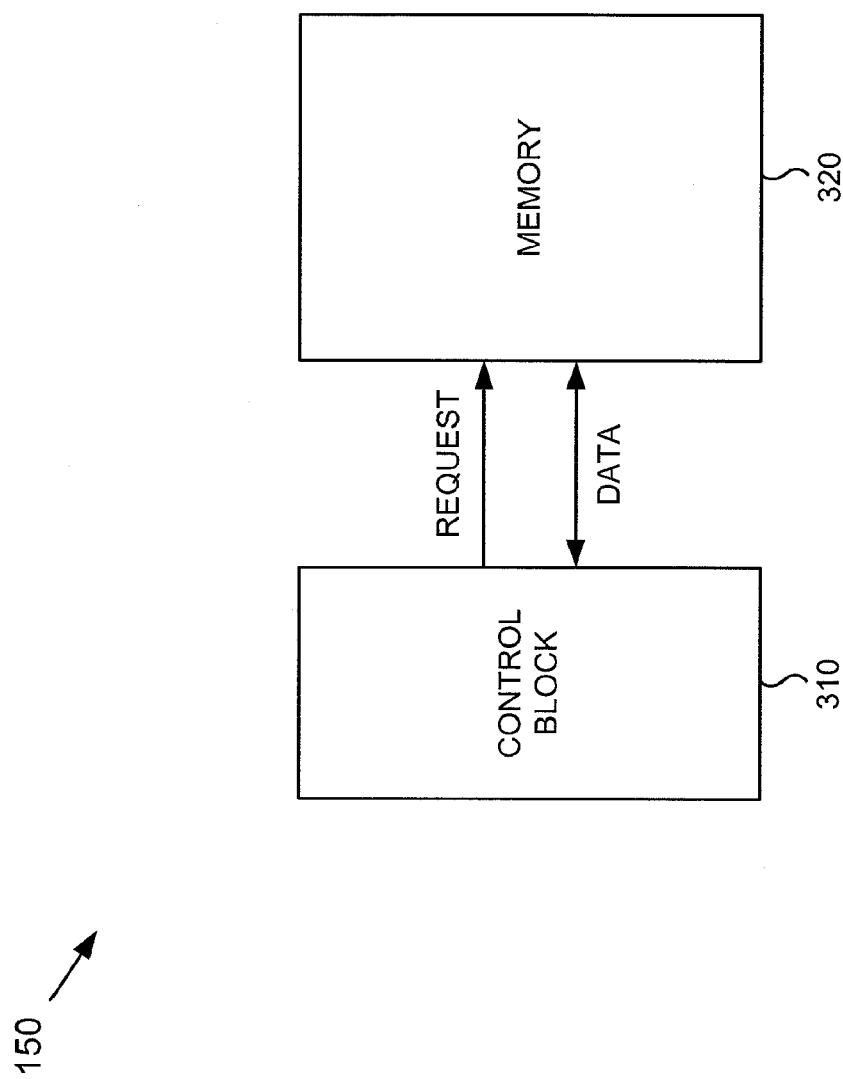
FIG. 3 is a diagram of an exemplary portion of the control memory of FIG. 1.

FIG. 3 is a diagram of an exemplary portion of control memory 150. Control memory 150 may include a control block 310 and a memory 320. Control block 310 may include logic that regulates access to memory 320. For example, control block 310 may receive requests from requestors 210 and regulate the sending of the requests to memory 320. In this case, control block 310 may function as an arbiter that arbitrates among the requests. Control block 310 may connect to memory 320 via a bus over which requests can be sent to memory 320 and data can be written to or read from memory 320.

Figure 4:
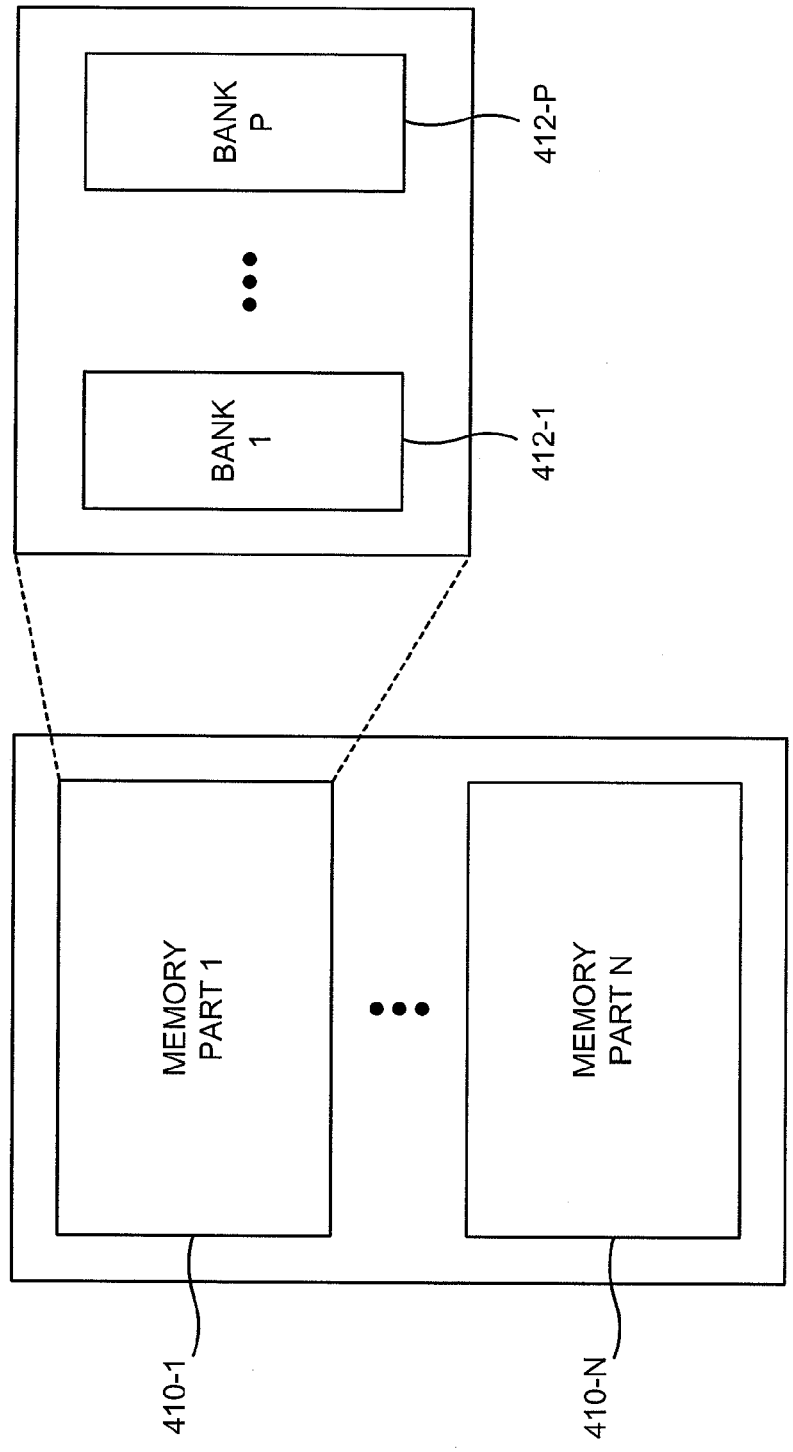
FIG. 4 is a diagram of an exemplary portion of the memory of FIG. 3.

Memory 320 may store the data structures. FIG. 4 is a diagram of an exemplary portion of memory 320. Memory 320 may include memory parts 410-1, . . . , 410-N (where N≧1) (collectively referred to herein as "memory parts 410"). In one implementation, each of memory parts 410 may store a replicated set of data. In another implementation, each of memory parts 410 may store a different set of data. Control block 310 may include a separate bus for each of memory parts 410, such that a separate request can be sent concurrently to each of memory parts 410. In this case, memory parts 410 may operate independently of each other. Reads may be performed on one of memory parts 410. Writes may be performed on all or multiple ones of memory parts 410 to maintain consistency.

Each of memory parts 410 may be organized into banks 412-1, . . . , 412-P (where P>1) (collectively referred to herein as "banks 412"). Memory 320 may have restrictions on how often a particular bank 412 can be accessed. For example, a restriction may specify that a certain number of clocks cycles (e.g., 3 clock cycles) pass between one access of a bank 412 and a next access of that same bank 412 (herein referred to as "access delay").

Exemplary Packet Forwarding Process

Figure 5:
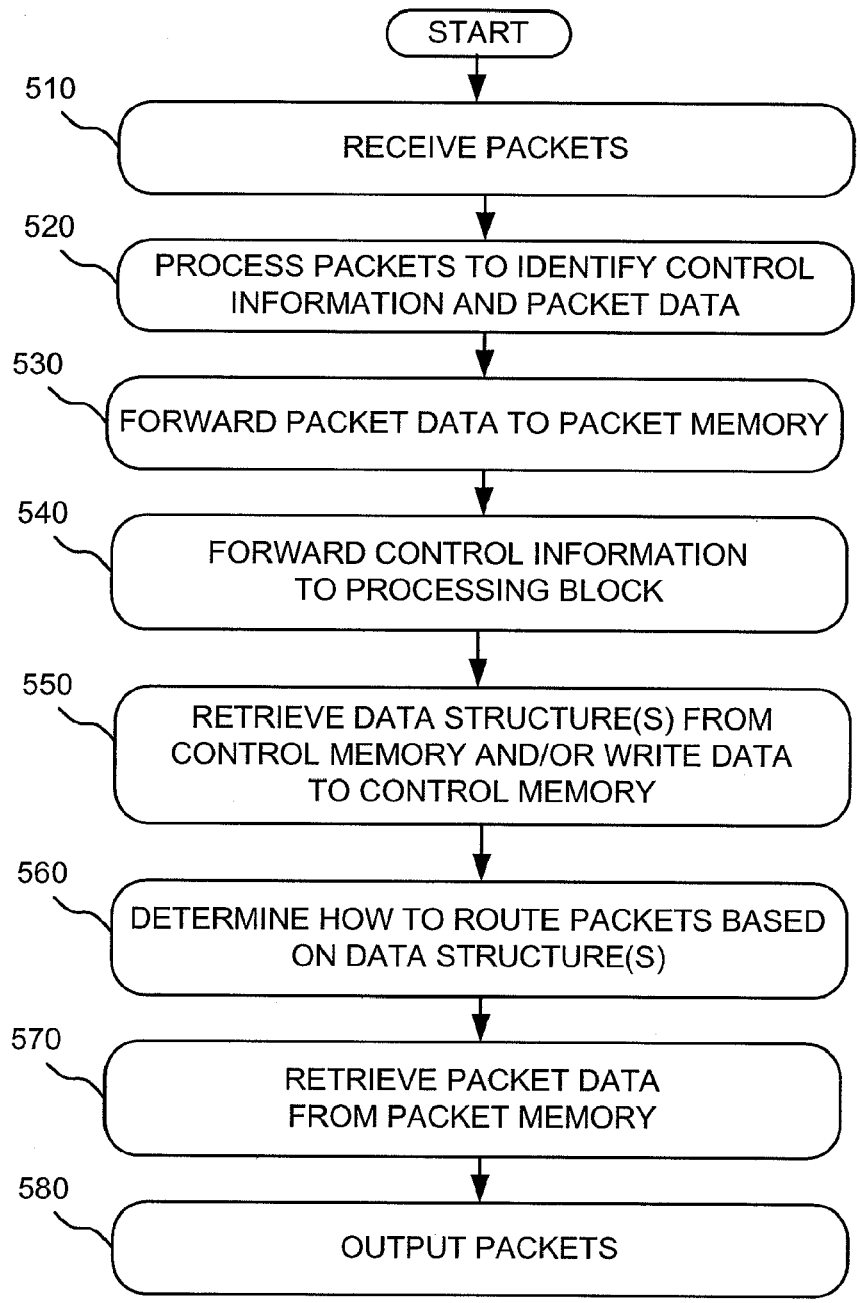
FIG. 5 is a flowchart of an exemplary process for forwarding a packet by the data processing device of FIG. 1.

FIG. 5 is a flowchart of an exemplary process for forwarding a packet by data processing device 100. Processing may begin with packets being received (block 510). For example, input block 110 may receive packets on one or more ingress links. The packets may be associated with a single stream of packets received on a particular ingress link or multiple streams of packets received on multiple ingress links.

The packets may be processed to identify their control information and their packet data (block 520). For example, input block 110 may analyze the packets to determine control information and packet data associated with the packets. As described above, the control information may be retrieved from the header of the packets and the packet data may be retrieved from the payload of the packets.

The packet data may be forwarded to packet memory 140 and the control information may be forwarded to processing block 130 (blocks 530 and 540). For example, input block 110 may send the packet data for storage in packet memory 140. As described above, the packet data associated with a particular packet may be stored in packet memory 140 as a variable sized data unit or as one or more fixed sized data units.

One or more data structures may be retrieved from control memory 150 and/or data may be written to control memory 150 (block 550). For example, a requestor 210 of processing block 130 may process control information associated with a packet. Requestor 210 may retrieve one or more data structures, such as a forwarding table, a routing table, and/or management data, from control memory 150. Requestor 210 may also, or alternatively, write one or more data structures, such as statistics data, to control memory 150. Requestor 210 may read or write data by sending a request to control memory 150. Requestors 210 may operate independently from each other and, thus, the requests from requestors 210 can form an unpredictable (almost random) access pattern across banks 412 of control memory 150.

It may be determined how to route the packets based on the one or more data structures retrieved from control memory 150 (block 560). For example, requestor 210 may process the control information for a packet based on the forwarding table, routing table, and/or management data to determine how the packet should be routed (e.g., on which egress link the packet should be transmitted, the priority to be given to the packet, etc.). Requestor 210 may send its processing results to output block 120. The processing results may identify the packet and the egress link on which the packet should be transmitted and might include header information associated with the packet.

Packet data may be retrieved from packet memory 140 (block 570). For example, output block 120 may receive processing results for a packet from a requestor 210 of processing block 130. Output block 120 may retrieve the packet data corresponding to the packet from packet memory 140 and reassemble the packet based on the packet data and the processing results from requestor 210.

The packets may be outputted on one or more egress links (block 580). For example, output block 120 may transmit the packets based on the processing results from requestors 210 of processing block 130.

Exemplary Functional Block Diagram of Data Processing Device

Implementations described herein may relate to providing a flexible or fixed partition of bandwidth of control memory 150. Data processing device 100 may be programmed to operate in different modes. In a first mode, the bandwidth of control memory 150 may be flexibly partitioned among requestors 210, such that any of requestors 210 may access data in any of memory parts 410 and/or memory banks 412. In a second mode, the bandwidth of control memory 150 may be hard partitioned among requestors 210, such that a particular one of memory parts 410 and/or memory banks 412 may be assigned to one of requestors 210. In a third mode, the bandwidth of control memory 150 may be both flexibly and hard partitioned. The particular mode in which data processing device 100 is programmed to operate may depend on the environment in which data processing device 100 is used and/or certain operational characteristics desired by an operator of data processing device 100.

Figure 6:
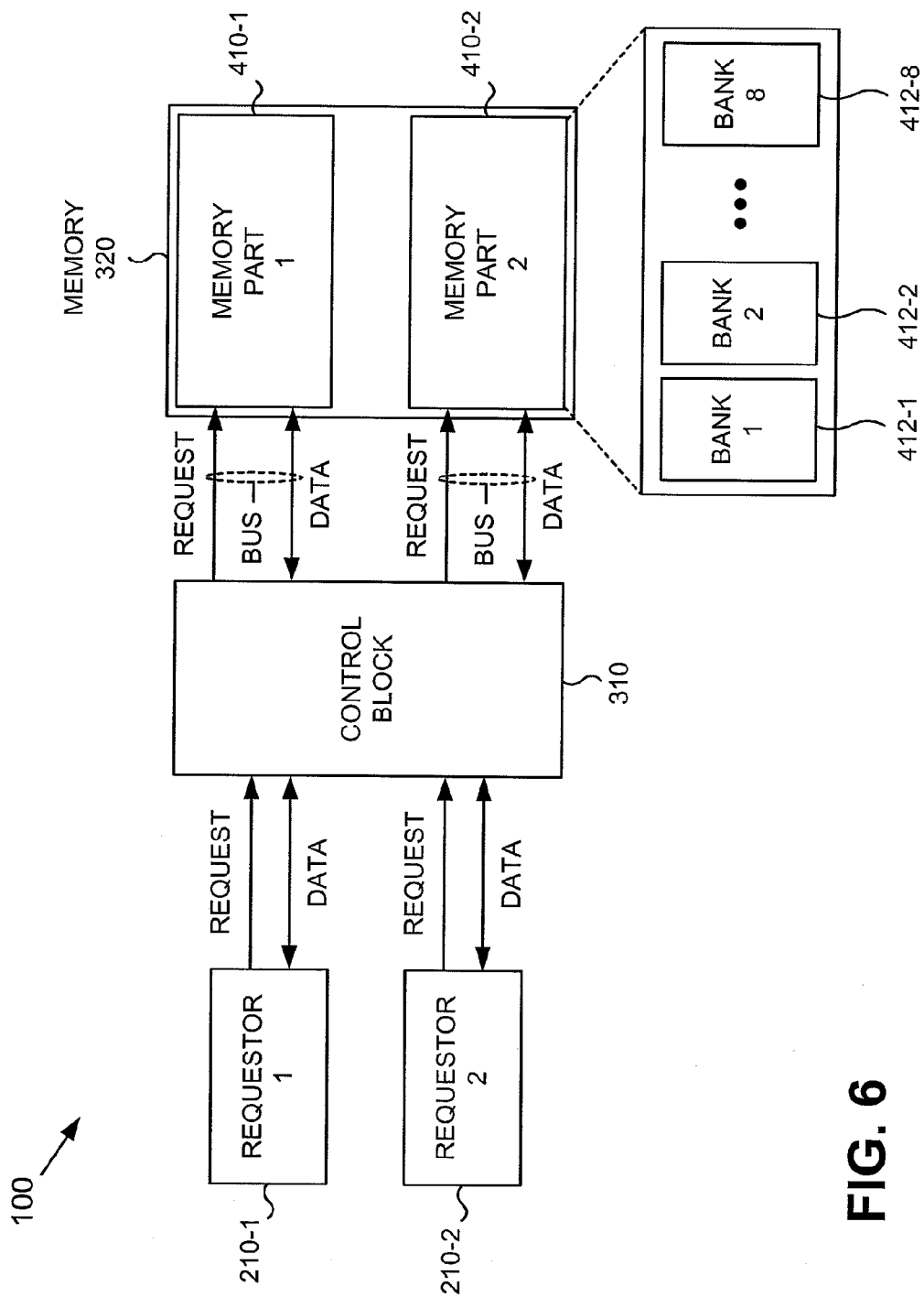
FIG. 6 is a functional block diagram of an exemplary portion of the data processing device of FIG. 1.

FIG. 6 is a functional block diagram of an exemplary portion of data processing device 100. As shown in FIG. 6, data processing device 100 may include requestors 210-1 and 210-2 connected to memory parts 410-1 and 410-2 of memory 320 via control block 310, where each of memory parts 410-1 and 410-2 may include banks 412-1, . . . , 412-8. FIG. 6 shows data processing device 100 as including two requestors 210, two memory parts 410, and eight banks 412 for the discussion to follow. In practice, data processing device 100 may include more or fewer requestors 210, memory parts 410, and banks 412.

Each of requestors 210 may send requests to control block 310 for access to memory 320. Control block 310 may function as an arbiter to regulate the sending of the requests to memory parts 410 of memory 320. Control block 310 may operate under certain memory constraints. For example, there may be a certain (finite) delay to read or write data (e.g., a bank 412 may be inaccessible for a certain number of clock cycles after a read from or write to that bank 412). Also, there may be a certain (finite) delay to transition from a read operation to a write operation, or vice versa. Further, there may be a single bus between control block 310 and each of memory parts 410. A single request may be sent from control block 310 to one of memory parts 410 on the bus during a given clock cycle.

Flexible Bandwidth Partitioning

In the first mode, the bandwidth of control memory 150 may be flexibly partitioned among requestors 210, such that either of requestors 210 may access data in either of memory parts 410 and/or any of memory banks 412. In one implementation, each of memory parts 410 may store replicated data. Each of banks 412 in either memory part 410 may store data associated with both requestors 210.

Control block 310 may regulate access by requestors 210 to the data in memory parts 410 and banks 412. Control block 310 may receive requests from requestors 210. A request from a requestor 210 may include an address and a valid signal. The address may identify the location in memory 320 to read or write data. In one implementation, the lower ceiling ($\log_2 P$) bits (e.g., 3 bits) of the address (where ceiling( ) is a function that rounds up to the nearest integer) may identify a bank 412 to be accessed. The valid signal may identify whether the request is valid.

Figure 7:
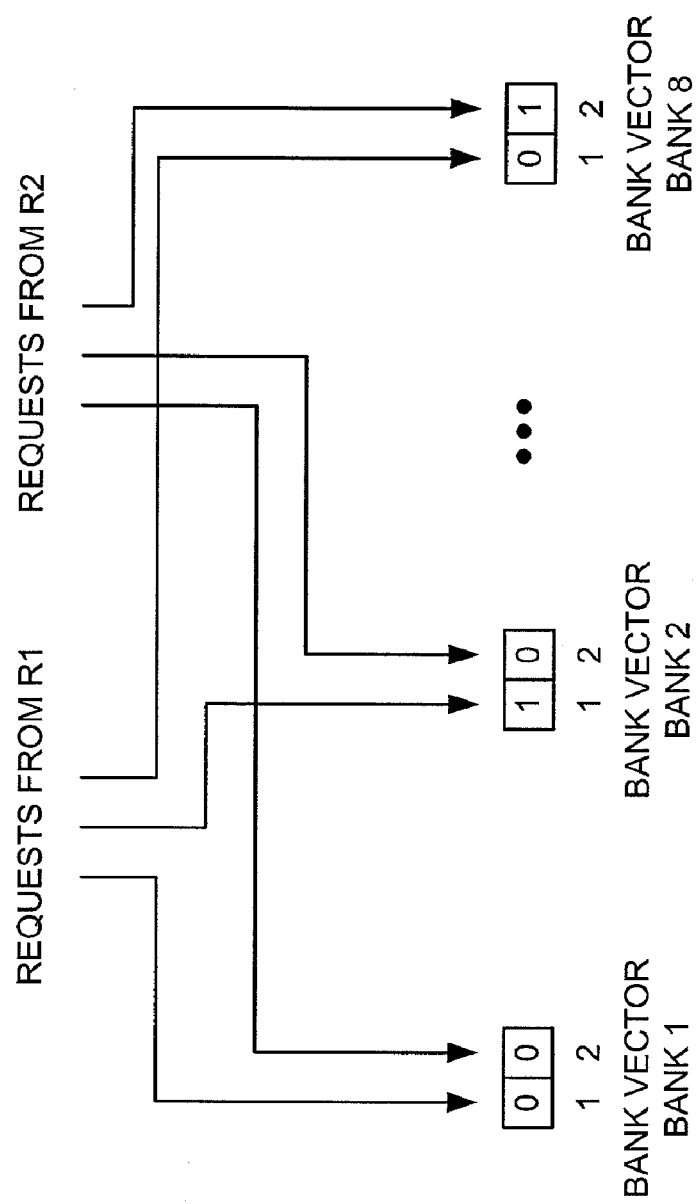
FIG. 7 is a diagram of exemplary bank request vectors.

Control block 310 may generate a bank request vector for each of banks 412. The bank request vector associated with a bank 412 may identify whether a request was received from one of requestors 210 that is intended for that bank 412. FIG. 7 is a diagram of exemplary bank request vectors that may be generated. Control block 310 may analyze the valid requests received in a clock cycle and determine to which banks 412 the requests are intended based on, for example, the lower 3 bits of the addresses included in the requests. Control block 310 may generate a bank request vector for each of banks 412.

The bank request vector may include a number of bits corresponding to the number of requestors 210. A bit may be set to a first value in a bank request vector to indicate that the corresponding one of requestors 210 requests access to the corresponding one of banks 412, or to a second value to indicate that the corresponding requestor 210 does not request access to the corresponding bank 412. For example, assume that control block 310 receives requests from requestors 210-1 and 210-2 during a certain clock cycle and determines that the request from requestor 210-1 is intended for bank 412-2 and the request from requestor 210-2 is intended for bank 412-8. In this case, control block 310 may generate a bank request vector for bank 412-2 in which the first bit (corresponding to requestor 210-1) is set to a first value and the other bit is set to a second value, and a bank request vector for bank 412-8 in which the first bit (corresponding to requestor 210-1) is set to a second value and the other bit is set to a first value, as shown in FIG. 7.

Figure 8:
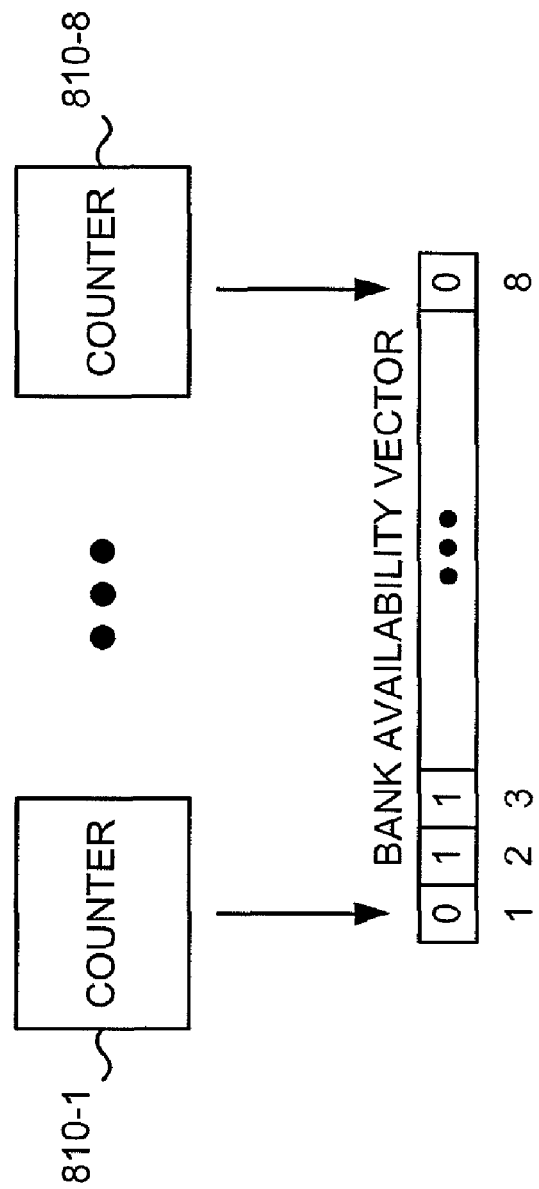
FIG. 8 is a diagram of an exemplary bank availability vector.

Control block 310 may generate a bank availability vector that identifies which of banks 412 are available to service a pending request. FIG. 8 is a diagram of an exemplary bank availability vector that may be generated. As shown in FIG. 8, control block 310 may maintain a number of counters 810-1, . . . , 810-8 (collectively referred to as "counters 810") that may be associated with banks 412-1, . . . , 412-8 of one of memory parts 410. Similar counters may be associated with banks 412 of the other one of memory parts 410.

In one implementation, each of counters 810 is set to a predetermined value whenever a request is sent to the corresponding bank 412. The predetermined value may correspond to the access delay (in clock cycles) associated with banks 412. Thus, a counter 810 may reflect how many clock cycles to wait before another access to the corresponding bank 412 can occur. In one implementation, counters 810 may count downward from the predetermined value to a zero value. Any counter 810 with a non-zero value may indicate that the corresponding bank 412 is unavailable for access. Any counter 810 with a zero value may indicate that the corresponding bank 412 is available for access.

Control block 310 may generate a bank availability vector for each of memory parts 410 that indicates whether each of the corresponding banks 412 is available for access. The bank availability vector may include a number of bits corresponding to the number of banks 412. A bit may be set to a first value to indicate that the corresponding bank 412 is available or to a second value to indicate that the corresponding bank 412 is unavailable. In one implementation, control block 310 may generate a bank availability vector in each clock cycle to indicate which banks 412 are available during that clock cycle. For example, assume that counters 810 indicate that banks 412-1 and 412-8 are unavailable and the other banks 412 are available. In this case, control block 310 may generate a bank availability vector in which bit 1 and bit 8 are set to the second value and the other bits are set to the first value, as shown in FIG. 8.

Control block 310 may generate a result vector that may identify which banks 412 are available and have requests to be serviced. FIG. 9 is a diagram of an exemplary result vector that may be generated for a memory part 410. As shown in FIG. 9, control block 310 may generate a combined bank vector and a replicated bank availability vector. The combined bank vector may include a vector generated based on a concatenation of the bank request vectors generated for a memory part 410. The replicated bank availability vector may include each bit of the bank availability vector replicated to M (e.g., 2) bits. In other words, if the bank availability vector includes a bit that indicates that bank 412-2 is available (e.g., set to 1), then the replicated bank availability vector would include two 1's for the portion of the replicated bank availability vector corresponding to bank 412-2, as shown in FIG. 9.

Control block 310 may generate the result vector based on the combined bank vector and the replicated bank availability vector. In one implementation, control block 310 may perform a logical AND operation on the bits in the combined bank vector and the replicated bank availability vector to form the result vector. The result vector may indicate which banks 412 are available and have requests to be serviced.

Figures 10, 11:
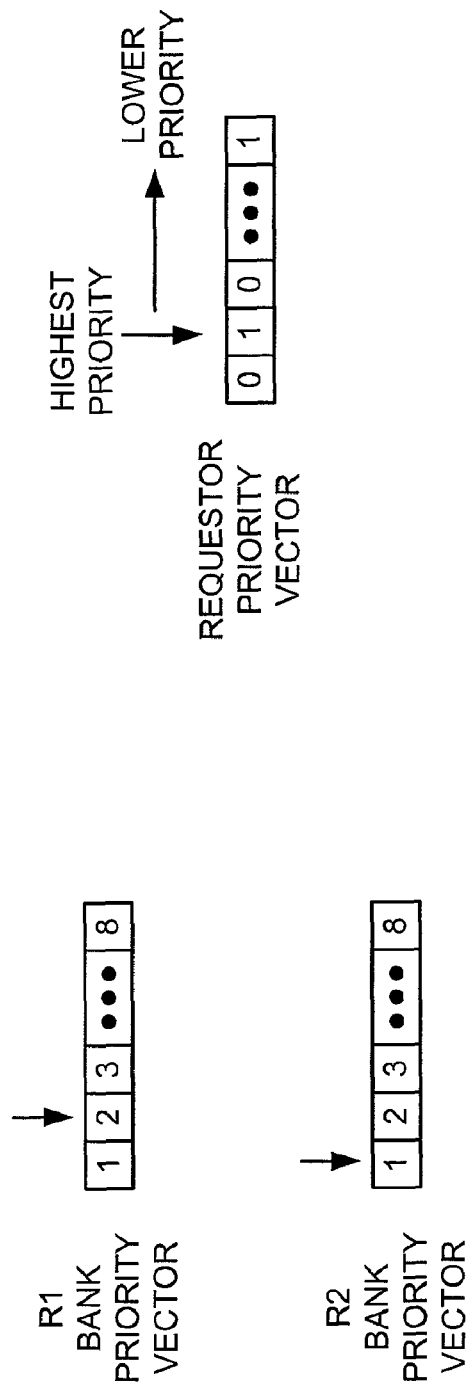
FIG. 10 is a diagram of exemplary per-requestor bank priority vectors.
FIG. 11 is a diagram of an exemplary requestor priority vector.

Control block 310 may maintain a per-requestor bank priority vector and/or a requestor priority vector. FIG. 10 is a diagram of exemplary per-requestor bank priority vectors that may be maintained. As shown in FIG. 10, a bank priority vector may be maintained for each of requestors 210. A bank priority vector may include a number of slots that identify the different banks 412. The length and contents of the bank priority vector may be programmable. A particular bank 412 may be identified in one or more slots. For a fair servicing of banks 412, each of banks 412 may be identified in an equal number of slots. Control block 310 may maintain a pointer (or use another technique) to identify which bank 412 is the highest priority bank for a current clock cycle.

FIG. 11 is a diagram of an exemplary requestor priority vector that may be maintained. As shown in FIG. 11, a requestor priority vector may include a number of slots that identify the different requestors 210. The length and contents of the requestor priority vector may be programmable. A particular requestor 210 may be identified in one or more slots. For a fair servicing of requestors 210, each of requestors 210 may be identified in an equal number of slots. Control block 310 may maintain a pointer (or use another technique) to identify an order of priority for requestors 210 in a current clock cycle.

Figure 12:
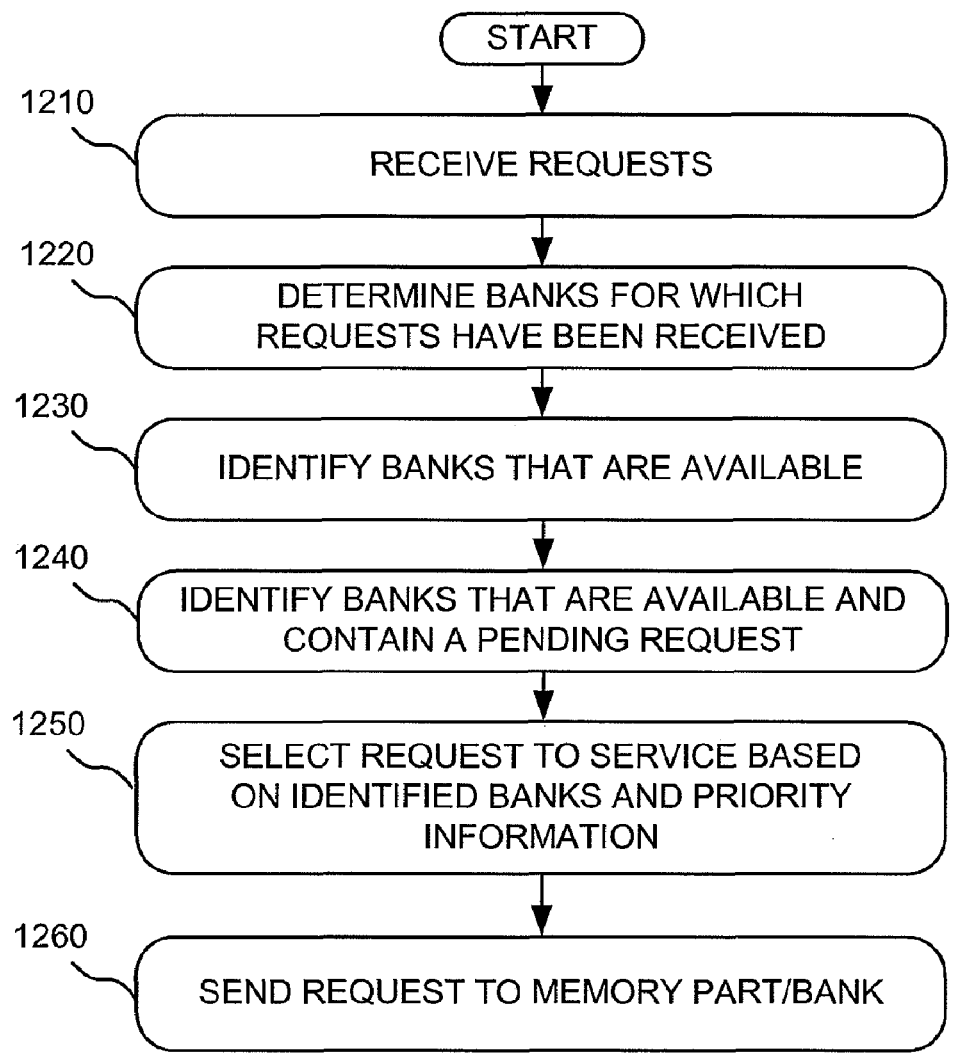
FIG. 12 is a flowchart of an exemplary process for providing a flexible partitioning of memory bandwidth.

FIG. 12 is a flowchart of an exemplary process for providing a flexible partitioning of memory bandwidth. In one implementation, the process described below may occur in a given clock cycle and may be repeated in subsequent clock cycles.

Processing may begin with requests being received (block 1210). For example, during a given clock cycle, control block 310 may receive a set of requests from a corresponding set of requestors 210. Control block 310 may identify valid requests based on, for example, valid signals included with the requests.

Banks 412 for which requests have been received may be determined (block 1220). For example, control block 310 may process a valid request from a requestor 210 to analyze the lower ceiling ($\log_2 P$) (e.g., 3) bits of the address to identify a bank 412 for which the request is intended. Control block 310 may generate a bank request vector for each of banks 412 that identifies one or more of requestors 210 from which a request was received during the given clock cycle that was intended for the corresponding bank 412. In this mode, a request from a particular requestor 210 can potentially be intended for any of banks 412 because there is no hard partitioning of the bandwidth of memory 320.

Banks 412 that are available (per memory part 410) may be identified (block 1230). For example, control block 310 may analyze the count values of counters 810 corresponding to banks 412. Control block 310 may generate a bank availability vector, based on the count values, that identifies which of banks 412 are available to service a request. As described above, a zero count value may indicate a bank 412 that is available.

Banks 412 that are available and that contain a pending request may be identified (block 1240). For example, control block 310 may generate a result vector (FIG. 9) that may identify which banks 412 are available and have requests to be serviced. Control block 310 may generate a combined bank vector by, for example, concatenating the bank request vectors (FIG. 7) generated for a memory part 410. Control block 310 may also generate a replicated bank availability vector that may include, for example, each bit of the bank availability vector (FIG. 8) replicated to M (e.g., 2) bits. Control block 310 may generate the result vector by, for example, combining the combined bank vector and the replicated bank availability vector. In one implementation, control block 310 may perform a logical AND operation on the bits in the combined bank vector and the replicated bank availability vector to form the result vector.

A request to service can be selected based on banks 412 that are available (per memory part 410) and that contain a pending request and priority information regarding requestors 210 and/or banks 412 (block 1250). As explained above, memory 320 may include N (e.g., 2) memory parts 410 that operate independently of each other. Control block 310 may include a separate bus to each of memory parts 410 to permit N requests (if possible) to be sent to memory 320 in a single clock cycle. Control block 310 may access the requestor priority vector (FIG. 11) to identify the priority order of requestors 210. In one implementation, control block 310 may identify a different priority order of requestors 210 for each of memory parts 410. Assume that the requestor priority vector identifies requestor 210-1 as having higher priority than requestor 210-2.

Control block 310 may identify at least two candidate requests (e.g., a high priority request and a low priority request) for each of memory parts 410. Control block 310 may determine, based on the bank priority vector (FIG. 10) and the result vector (FIG. 9), which pending request should be identified as the high priority request and which pending request should be identified as the low priority request based on banks 412 to which the requests are intended. The high priority request may identify the request that should go first, if possible, and the low priority request may identify the request that should go next, if possible.

Control block 310 may choose the combination of candidate requests such that multiple requestors 210, multiple high priority requests, and multiple memory parts 410 are serviced in each clock cycle. Due to the availability of banks 412, control block 310 may not be able to service high priority requests in every clock cycle. Thus, control block 310 may attempt to select the optimum combination of candidate requests. To select the optimum combination of candidate requests, control block 310 may give highest priority to trying to service all of memory parts 410, next highest priority to trying to service N requestors 210, and next highest priority to trying to service high priority.

A selected request may be sent to the appropriate bank 412 of a memory part 410 (block 1260). As explained above, control block 310 may include a separate bus to each of memory parts 410. In a given clock cycle, control block 310 may attempt to send a request to a bank 412 of each of memory parts 410. After sending a request to a bank 412, control block 310 may set counter 810 (FIG. 8) associated with that bank 412.

Hard Bandwidth Partitioning

In the second mode, the bandwidth of control memory 150 may be hard partitioned among requestors 210, such that a particular one of memory parts 410 and/or memory banks 412 may be assigned to one of requestors 210. The hard partitioning may be programmable. In other words, an operator may be permitted to configure and/or change the hard partition(s) via software.

In one implementation, each of memory parts 410 may store data associated with one of requestors 210. In this case, each of memory parts 410 may be assigned to one of requestors 210. Control block 310 may regulate access to memory 320 to send requests from requestors 210 to their assigned memory parts 410.

In another implementation, each of memory parts 410 may store replicated data. Each of banks 412 in either memory part 410 may store data associated with one of requestors 210. In this implementation, each of banks 412 may be assigned to one of requestors 210. Control block 310 may regulate access to memory 320 to send requests from requestors 210 to their assigned banks 412 based on, for example, the addresses in the requests.

Control block 310 may receive requests from requestors 210. A request from a requestor 210 may include an address and a valid signal. The address may identify the location in memory 320 to read or write data. In one implementation, the lower ceiling ($\log_2$ P) bits (e.g., 3 bits) of the address may identify a bank 412 to be accessed. The valid signal may identify whether the request is valid.

Returning to FIG. 6, assume for the discussion to follow that memory 320 stores two data structures (D1 and D2), where the data structure D1 may refer to the data for requestor 210-1 and the data structure D2 may refer to the data for requestor 210-2. Assume also that banks 412-1, . . . , 412-4 are assigned to requestor 210-1, and banks 412-5, . . . , 412-8 are assigned to requestor 210-2. In this case, the data structure D1 may be stored in banks 412-1, . . . , 412-4, and the data structure D2 may be stored in banks 412-5, . . . , 412-8. For data that is sequentially accessed, it may be beneficial to store the data associated with sequential accesses in separate banks 412 (due to the access delay). In the case of multiple data structures, like data structures D1 and D2, it may be beneficial to store the data associated with these data structures at opposite ends of the address space. In other words, the data associated with data structure D1 may be stored at the beginning of the address space and working downward, while the data associated with data structure D2 may be stored at the end of the address space and working upward. This may permit flexible storage of data within memory 320. In this situation, it may be beneficial to designate a portion of memory 320 (e.g., a common region) for storage of infrequently accessed data structures.

Figure 13:
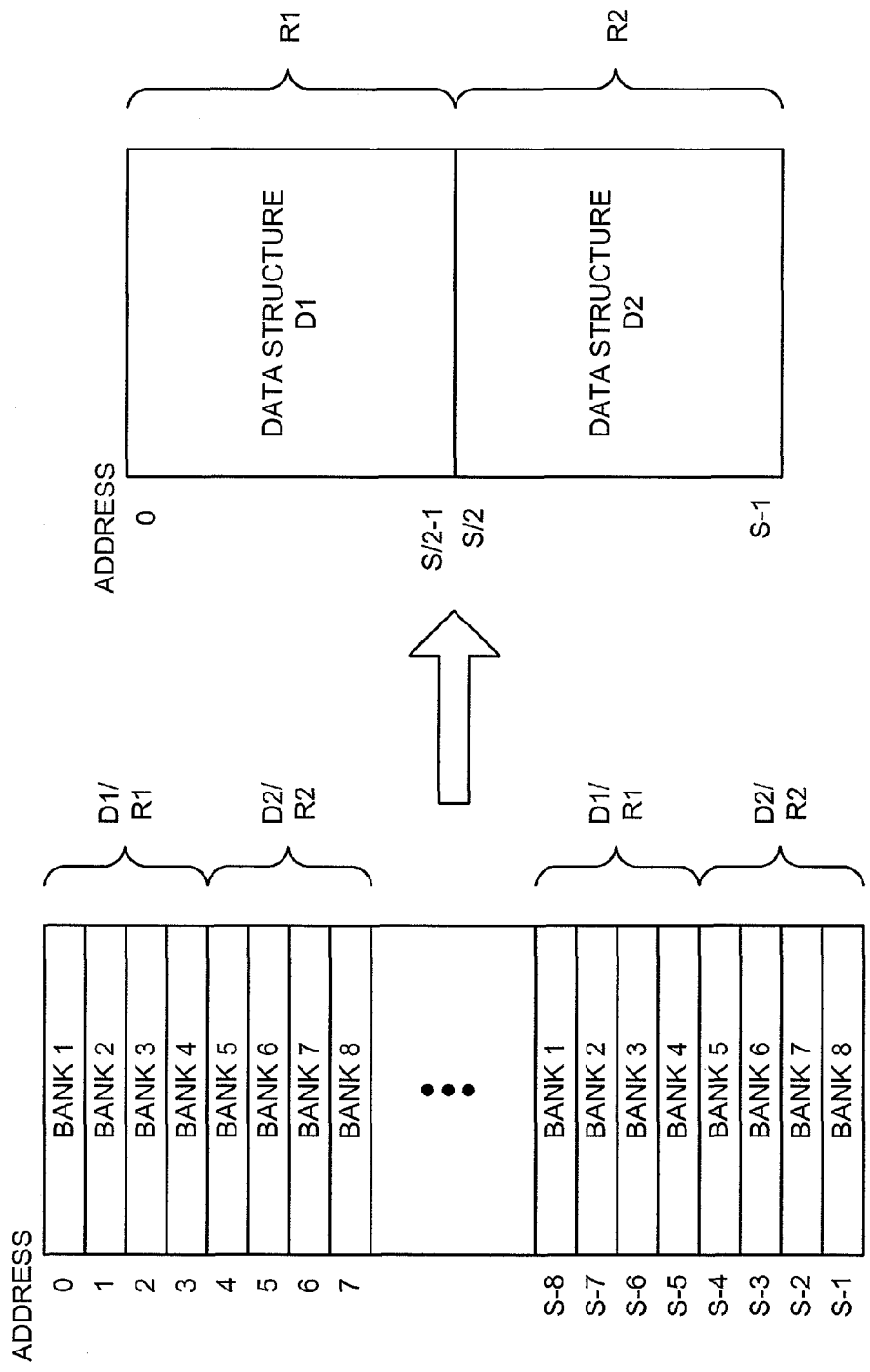
FIG. 13 is a diagram of an exemplary memory allocation scheme.

FIG. 13 is a diagram of an exemplary memory allocation scheme. When the lower ceiling ($\log_2$ P) (e.g., 3) bits are used to identify a bank 412, this causes the data associated with data structures D1 and D2 to be interleaved, as shown on the left in FIG. 13. For example, as shown in FIG. 13, data of data structure D1 (associated with requestor 210-1 (R1)) may be stored interleaved with data for data structure D2 (associated with requestor 210-2 (R2)). This is not desirable from a software standpoint because it requires the software to jump from location-to-location when retrieving data associated with the same data structure. Instead, the software (e.g., of control block 310) desires to see the data associated with a particular data structure as stored in contiguous locations in memory 320, as shown on the right in FIG. 13. For example, as shown on the right in FIG. 13, data of data structure D1 (associated with requestor 210-1) may be stored in contiguous locations, and data for data structure D2 (associated with requestor 210-2) may be stored in contiguous locations.

To permit the data associated with data structures D1 and D2 to be stored in memory 320 as shown on the left of FIG. 13 while presenting the data to the software as shown on the right of FIG. 13, control block 310 may perform a mapping operation. For example, control block 310 may perform a mapping operation from a first memory space (corresponding to the left side of FIG. 13) to a second memory space (corresponding to the right side of FIG. 13).

Figure 14:
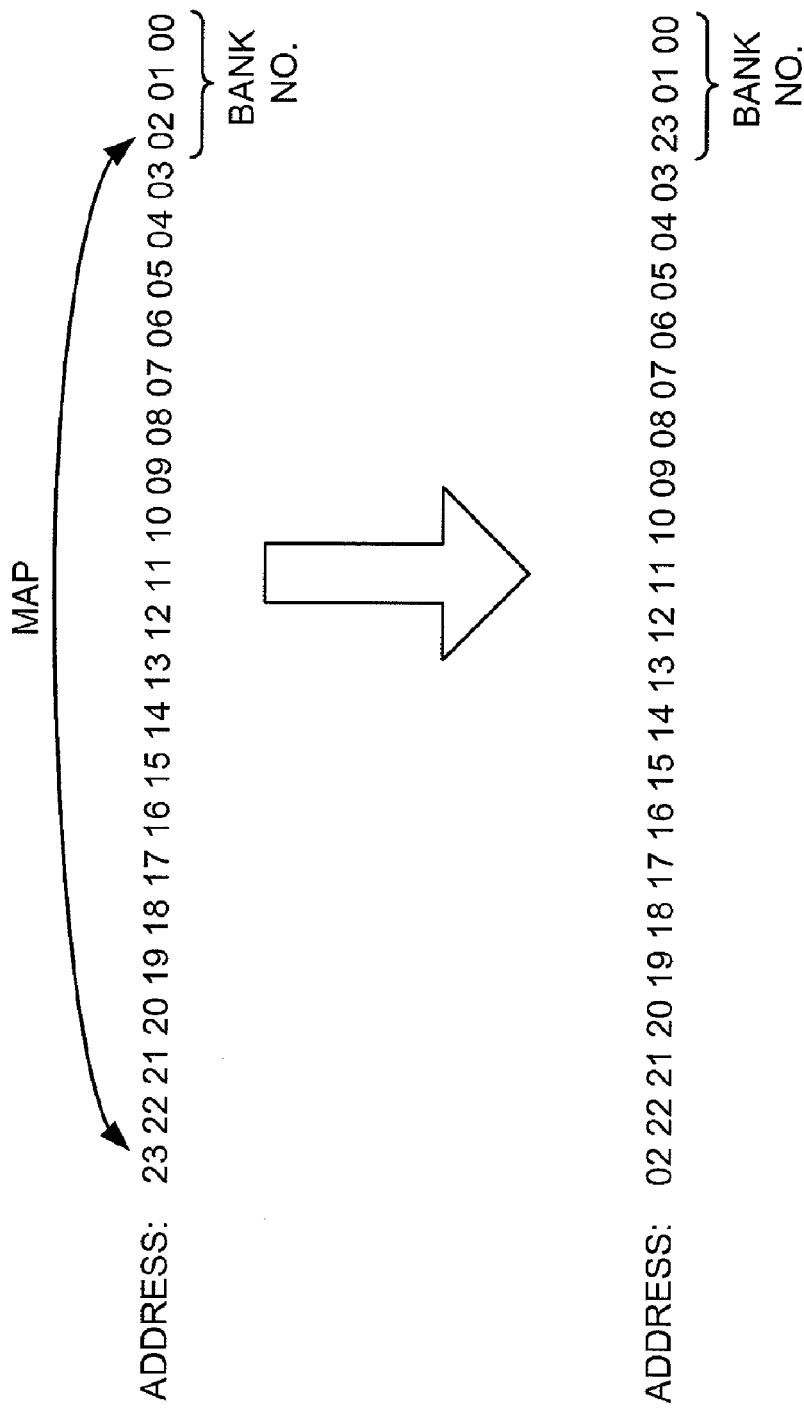
FIG. 14 is a diagram of an exemplary memory mapping operation.

FIG. 14 is a diagram of an exemplary memory mapping operation. As shown in FIG. 14, assume that the address included in a request from a requestor 210 includes 24 bits [23:0] and the lower 3 bits [2:0] identify a bank 412. In one implementation, as shown in FIG. 14, control block 310 may map the most significant bit {23} to bit {02} of the address. In this case, control block 310 may use bits {23, 01, 00} to identify a bank 412. In another implementation, control block 310 may map other bits of the address to change the hard partitioning of memory 320. For example, control block 310 may map bits {23, 22} to bits {02, 01} to assign banks 412-1 and 412-2 to requestor 210-1, and assign banks 412-3, ..., 412-8 to requestor 210-2. The particular bit locations that are used in the memory mapping operation may be programmable. By performing this memory mapping operation, control block 310 may make the interleaved data appear as data stored in contiguous locations in memory 320.

In one exemplary implementation, control block 310 may maintain a lookup table that maps a set of bits (e.g., bit {23} or bits {23, 22}) from the address to a particular bank 412. In this case, control block 310 may read the set of bits from the address and use the set of bits to identify a location in the lookup table. Control block 310 may then read a bank identifier, corresponding to one of banks 412, from the identified location in the lookup table.

Figure 15:
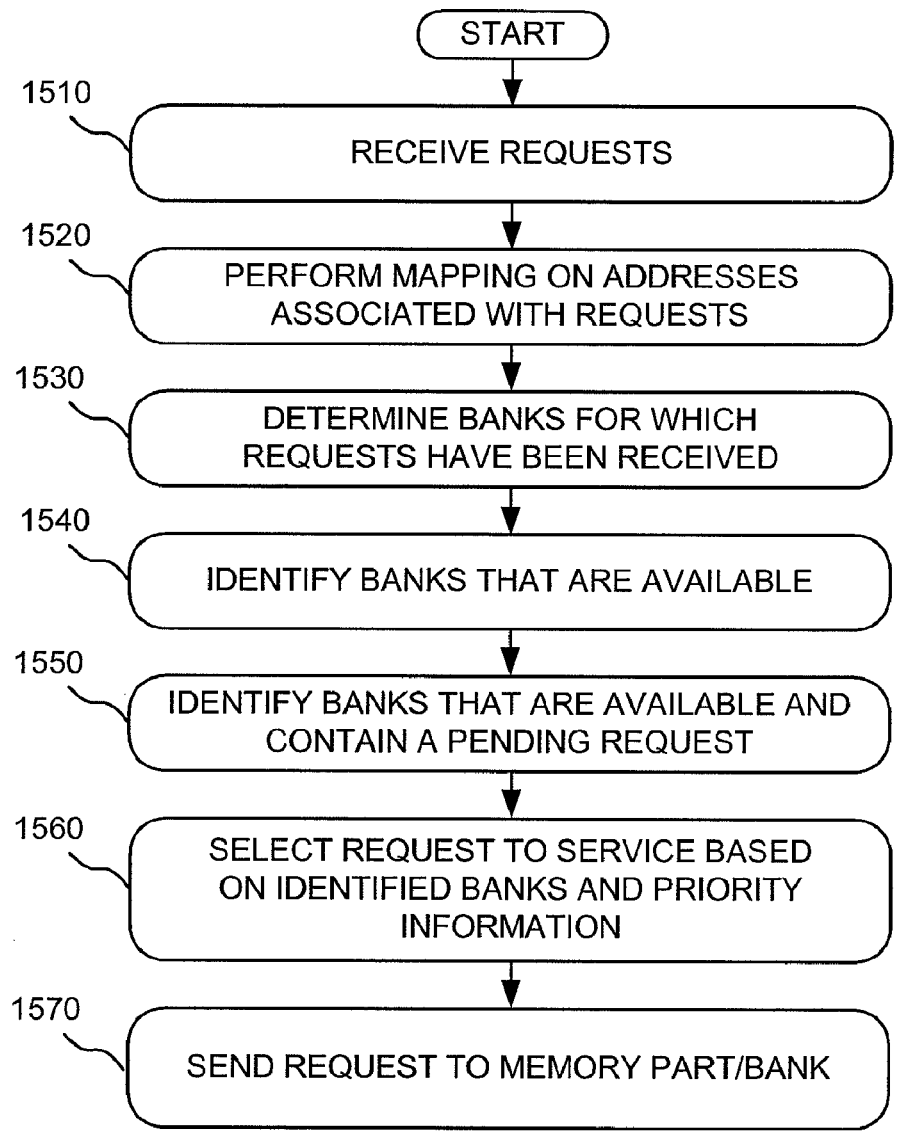
FIG. 15 is a flowchart of an exemplary process for providing a hard partitioning of memory bandwidth.

FIG. 15 is a flowchart of an exemplary process for providing a hard partitioning of memory bandwidth. In one implementation, the process described below may occur in a given clock cycle and may be repeated in subsequent clock cycles.

Processing may begin with requests being received (block 1510). For example, during a given clock cycle, control block 310 may receive a set of requests from a corresponding set of requestors 210. Control block 310 may identify valid requests based on, for example, valid signals included with the requests.

A mapping may be performed on the addresses associated with valid requests (block 1520). For example, control block 310 may map a first set of bits (e.g., bit 23) to a second set of bits (e.g., bit 2) of an address to form a modified address. In one implementation, control block 310 may swap the first set of bits with the second set of bits of an address to form the modified address.

Banks 412 for which requests have been received may be determined (block 1530). For example, control block 310 may process a valid request from a requestor 210 to analyze the lower ceiling ($\log_2 P$) (e.g., 3) bits of the modified address to identify a bank 412 for which the request is intended. Control block 310 may generate a bank request vector for each of banks 412 that identifies one or more of requestors 210 from which a request was received during the given clock cycle that was intended for the corresponding bank 412.

Banks 412 that are available may be identified (block 1540). For example, control block 310 may analyze the count values of counters 810 corresponding to banks 412. Control block 310 may generate a bank availability vector, based on the count values, that identifies which of banks 412 have a pending request. As described above, a zero count value may indicate a bank 412 that is available.

Banks 412 that are available and that contain a pending request may be identified (block 1550). For example, control block 310 may generate a result vector (FIG. 9) that may identify which banks 412 are available and have requests to be serviced for each memory part 410. Control block 310 may generate a combined bank vector by, for example, concatenating the bank request vectors (FIG. 7) generated for a memory part 410. Control block 310 may also generate a replicated bank availability vector that may include, for example, each bit of the bank availability vector (FIG. 8) replicated to M (e.g., 2) bits. Control block 310 may generate the result vector by, for example, combining the combined bank vector and the replicated bank availability vector. In one implementation, control block 310 may perform a logical AND operation on the bits in the combined bank vector and the replicated bank availability vector to form the result vector.

A request to service can be selected based on banks 412 that are available (per memory part 410) and that contain a pending request and priority information regarding requestors 210 and/or banks 412 (block 1560). As explained above, memory 320 may include N (e.g., 2) memory parts 410 that store replicated data and operate independently of each other. Each of banks 412 of a memory part 410 may be assigned to a particular one of requestors 210. If bank 412-1 of memory part 410-1 is assigned to a particular requestor 210, it may be beneficial to assign bank 412-1 of all memory parts 410 to that same requestor 210.

Control block 310 may include a separate bus to each of memory parts 410 to permit N requests (if possible) to be sent to memory 320 in a single clock cycle. Control block 310 may access the requestor priority vector (FIG. 11) to identify the priority order of requestors 210. In one implementation, control block 310 may identify a different priority order of requestors 210 for each of memory parts 410.

Control block 310 may identify at least two candidate requests (e.g., a high priority request and a low priority request) for each of memory parts 410. Control block 310 may determine, based on the bank priority vector (FIG. 10) and the result vector (FIG. 9), which pending request should be identified as the high priority request and which pending request should be identified as the low priority request based on banks 412 to which the requests are intended. The high priority request may identify the request that should go first, if possible, and the low priority request may identify the request that should go next, if possible.

Control block 310 may choose the combination of candidate requests such that multiple requestors 210, multiple high priority requests, and multiple memory parts 410 are serviced in each clock cycle. Due to the availability of banks 412, control block 310 may not be able to service high priority requests in every clock cycle. Thus, control block 310 may attempt to select the optimum combination of candidate requests. To select the optimum combination of candidate requests, control block 310 may give highest priority to trying to service all of memory parts 410, next highest priority to trying to service N requestors 210, and next highest priority to trying to service high priority.

A selected request may be sent to the appropriate bank 412 of a memory part 410 (block 1570). As explained above, control block 310 may include a separate bus to each of memory parts 410. In a given clock cycle, control block 310 may attempt to send a request to a bank 412 of each of memory parts 410. After sending a request to a bank 412, control block 310 may set counter 810 (FIG. 8) associated with that bank 412.

Combined Flexible and Hard Bandwidth Partitioning

Figure 16B:
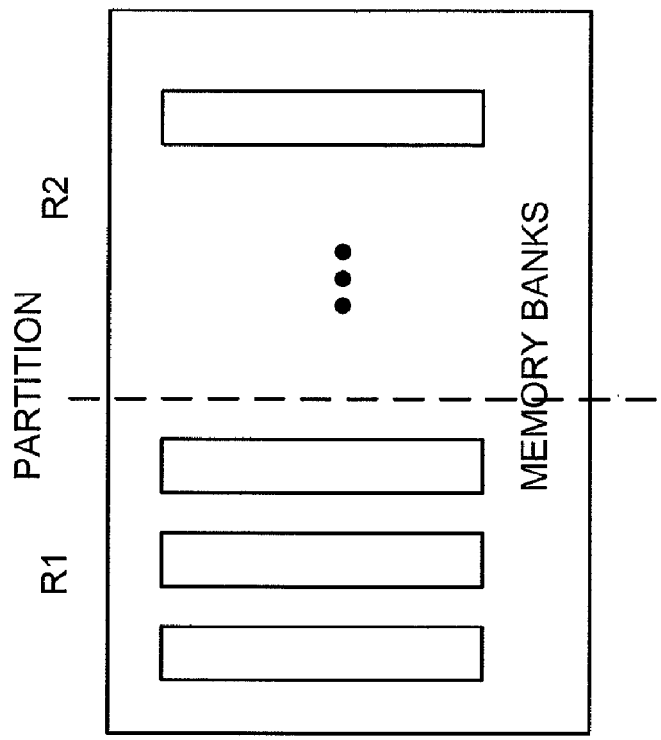
FIGS. 16A-16C are diagrams of exemplary memory space and memory bank partitioning.
Figure 16A:
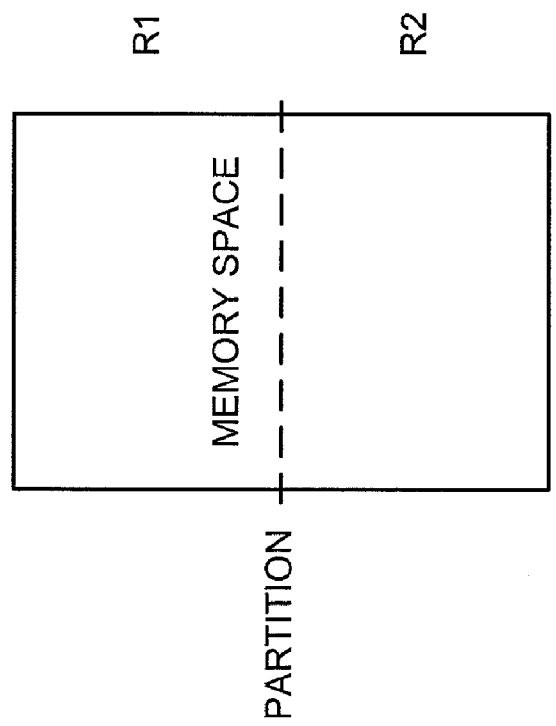
Figure 16C:
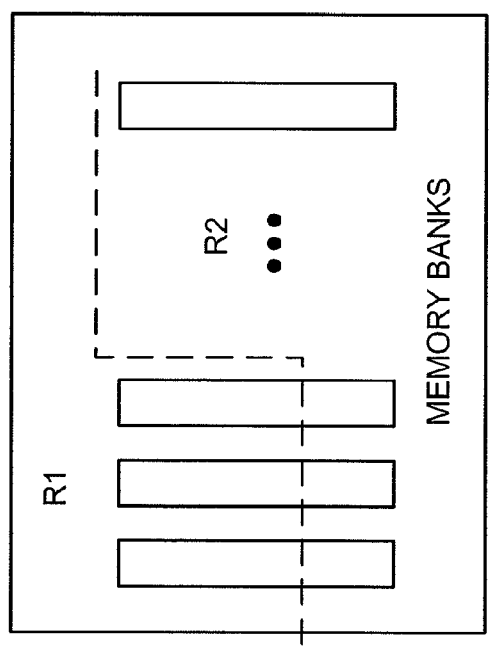

In the third mode, the bandwidth of control memory 150 may be both flexibly and hard partitioned. The techniques described above may permit a partition to be made across the address space (as shown in FIG. 16A), a partition to be made across memory banks 412 (as shown in FIG. 16B), or a combination of the two (as shown in FIG. 16C). A combination of the techniques may be used to partition control memory 150 in almost any manner that is desired. For example, the amount of memory bandwidth made available to a particular requestor 210 can be limited by limiting the address space available to that requestor 210, limiting banks 412 available to that requestor 210, and/or changing the bits in the requestor priority vector.

Figure 17:
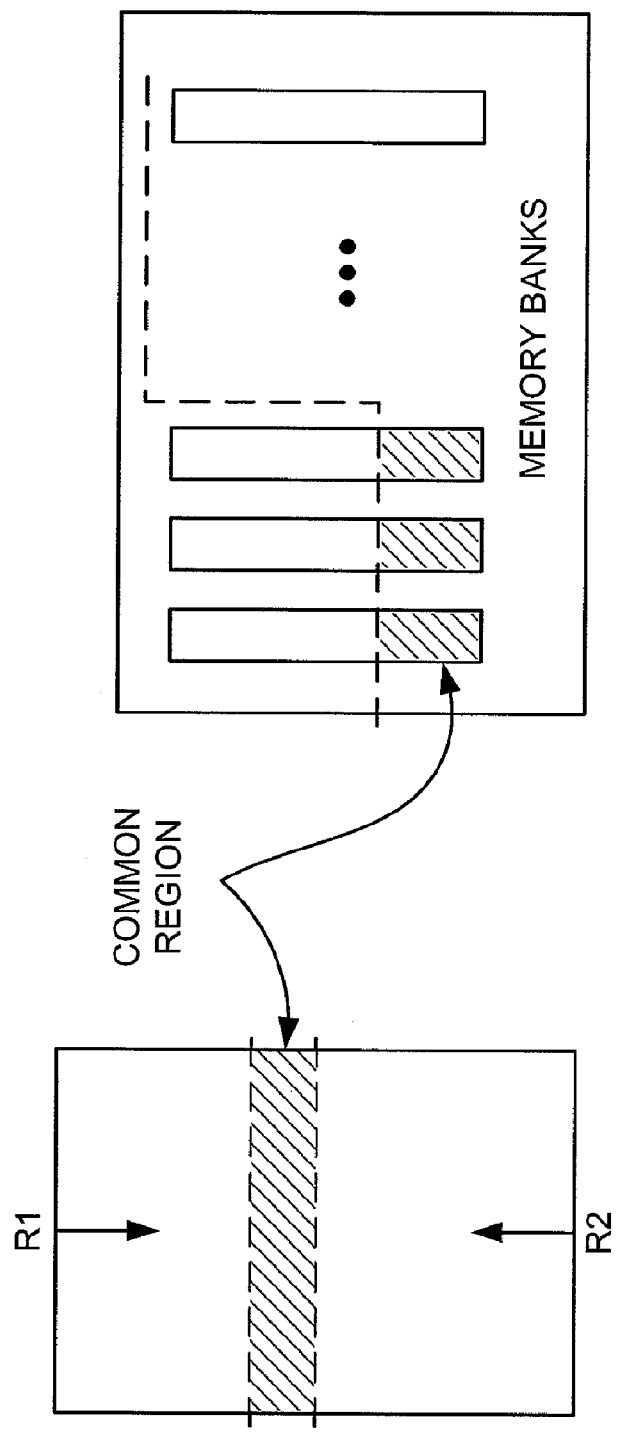
FIG. 17 is a diagram of a partition of the memory space and the memory banks.

In one implementation, as shown in FIG. 17, a partition may be made across the address space and a partition may be made across the memory banks. If the data structures for requestor R1 are stored at the beginning of the address space and working downward (in the address space) and the data structures for requestor R2 are stored at the end of the address space and working upward (in the address space), as shown in FIG. 17, then requestor R1 or R2 can use more than its initially allocated memory space. For example, a common region, as shown in FIG. 17, may include that portion of the address space and/or memory banks initially assigned to R1, but is being used by R2. It may be beneficial to store infrequently used data structures of R2 in the common region so that R1 can continue to obtain adequate access to the memory.

CONCLUSION

Implementations described herein may provide flexibility in partitioning of memory bandwidth, flexibility in the memory space, the ability to scale both the bandwidth and the memory, efficiency in the utilization of memory, ease of use for software (e.g., programmability and/or management of data structures), and/or fairness among requestors. To accomplish these features, the implementations may use the following schemes (alone or in combination): (1) replicating data across memory parts, (2) mapping a first set of bits of the memory address to a second set of bits, and (3) cycling through a requestor priority vector to assign priority to the requestors. Each of the above-identified schemes may be turned on or off. The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5, 12, and 15, the order of the acts may differ in other implementations. Also, non-dependent acts may be performed in parallel.

Also, the preceding description referred to a data processing device that processes "packets." The data processing device may process any type or form of data unit, where a "data unit" may refer to packet or non-packet data.

Further, certain portions of the description referred to "logic" that performs one or more functions. This logic may include hardware, such as a processor, an application specific integrated circuit, or a field programmable gate array, software, or a combination of hardware and software.

It will also be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A network device, comprising:
    a plurality of requestors to:
        issue requests to process data received by the network device based on control information included in the data;
    a memory that includes a plurality of memory parts, each memory part, of the plurality of memory parts, including a plurality of memory banks; and
    a control block to:
        receive requests from a set of requestors, of the plurality of requestors, each request, of the received requests, including an address,
        perform a mapping operation on each address, of the addresses included in the received requests, to map the address from a first address space, associated with a particular memory part, of the plurality of memory parts, to a second address space, associated with a particular memory bank, of the plurality of memory banks corresponding to the particular memory part, the mapping operation mapping a first set of bits of the address to a second set of bits of the address,
        identify, for each address, of the addresses included in the received requests, a memory bank, of the plurality of memory banks, based on the second address space,
        generate, for each identified memory bank, of the identified memory banks, a bank request vector that identifies a requestor, of the plurality of requestors, from which a request, intended for the identified memory bank, was received,
        generate a bank availability vector that is based on an availability of each identified memory bank, of the identified memory banks,
        generate a result vector that is based on the bank request vector and the bank availability vector,
        identify, based on the result vector, a set of requests, of the received requests, that are each associated with an available memory bank, of the available memory banks,
        when identifying the set of requests, the control block is to:
            identify, based on a first priority, that the set of requests is associated with a highest quantity of different memory parts, of the plurality of memory parts,
            identify, based on a second priority, that the set of requests is associated with a highest quantity of different requestors, and
            identify, based on a third priority, that the set of requests is associated with a highest quantity of high priority requests, the first priority comprising a higher priority relative to the second priority and the second priority comprising a higher priority relative to the third priority, and
        send each of the requests, of the identified set of requests, to the identified memory bank, associated with each request during a single clock cycle.

2. The network device of claim 1, where a position of at least one of the first set of bits or the second set of bits is programmable.

3. The network device of claim 1, where, when identifying the one of the memory banks, the control block uses a third set of bits, of the address in the second address space, to determine the one of the memory banks, the third set of bits including the first set of bits.

4. The network device of claim 1, where, when performing the mapping operation on each address, the control block swaps the first set of bits of the address with the second set of bits of the address.

5. The network device of claim 4, where a position of at least one of the first set of bits or the second set of bits is programmable.

6. The network device of claim 1, where data associated with a first requestor, of the plurality of requestors, is interleaved, in the memory, with respect to data associated with at least a second requestor, of the plurality of requestors, where the second requestor is different from the first requestor.

7. The network device of claim 1, where the data associated with a first requestor, of the plurality of requestors, is interleaved, in the memory, with respect to data associated with at least a second, different requestor, of the plurality of requestors, in the first address space, and the data associated with the first requestor is stored contiguously in the memory in the second address space.

8. The network device of claim 1, where, when identifying, for each address, of the addresses included in the received requests, the memory bank, the control block uses a set of low order bits, of the second address in the second address space, to determine the memory bank.

9. A device, comprising:
a plurality of requestors to issue requests;
a memory that includes a plurality of memory parts that store a replicated set of data accessible to the plurality of requestors, at least a first memory part, of the plurality of memory parts, including a plurality of memory banks; and
a control block to:
receive a plurality of requests from a set of requestors, of the plurality of requestors, each request, of the plurality of requests, including an address,
map, for each request, of the plurality of requests, a first set of bits of the address to a second set of bits of the address to form a modified address associated with the request,
identify, for each request, of the plurality of requests, a memory bank, of the plurality of memory banks based on a particular portion of the modified address,
generate a bank request vector based on the identified memory banks,
generate a bank availability vector based on an availability of the identified memory banks, the bank availability vector including a plurality bits,
generate a result vector by combining the bank request vector and the bank availability vector,
identify, based on the result vector, a set of requests, of the received plurality of requests, that are each associated with an available memory bank,
when identifying the set of requests, the control block is to:
identify, based on a first priority, that the identified set of requests is associated with a highest quantity of different memory parts, of the plurality of memory parts,
identify, based on a second priority, that the set of requests is associated with a highest quantity of different requestors, and
identify, based on a third priority, that the set of requests is associated with a highest quantity of high priority requests, the first priority comprising a higher priority relative to the second priority and the second priority comprising a higher priority relative to the third priority, and
send each request, of the identified set of requests, to the identified memory bank, associated with each request during a single clock cycle.

10. The device of claim 9, where a position of at least one of the first set of bits or the second set of bits is programmable.

11. The device of claim 9, where, when mapping the first set of bits to the second set of bits, the control block swaps the first set of bits of the address with the second set of bits of the address.

12. The device of claim 11, where a position of at least one of the first set of bits or the second set of bits is programmable.

13. The device of claim 9, where data associated with a first requestor, of the plurality of requestors, is interleaved, in the memory, with respect to data associated with at least a second requestor, of the plurality of requestors.

14. The device of claim 9, where, when identifying, for each request, of the plurality of requests, the memory bank, the control block is to use a set of low order bits of the modified address to determine the memory bank, the set of low order bits including the first set of bits.

15. A method, comprising:
receiving a plurality of requests, from a plurality of requestors, to read data from or write data to a memory that includes a plurality of memory parts,
each memory part, of the plurality of memory parts, including a plurality of memory banks, and
each request, of the plurality of requests, including an address that is associated with a particular memory part, of the plurality of memory parts;
performing, for each request, of the plurality of requests, a mapping operation, on the address included in the request, to map the address from a first address space, associated with the particular memory part, to a second address space, performing, for each request, of the plurality of requests, the mapping operation including:
swapping a first bit of the address with a second bit of the address;
identifying, for each request, of the plurality of requests, a memory bank, of the plurality of memory banks, based on the swapped second bit of the address;
generating a bank request vector based on the identified memory banks;
generating a bank availability vector based on an availability of the identified memory banks;
generating a result vector based on the bank request vector and the bank availability vector;
identifying, based on the result vector, a set of requests, of the plurality of requests, that are each associated with an available memory bank, identifying the set of requests including:
identifying, based on a first priority, that the identified set of requests is associated with a highest quantity of different memory parts, of the plurality of memory parts,
identifying, based on a second priority, that the set of requests is associated with a highest quantity of different requestors, and
identifying, based on a third priority, that the set of requests is associated with a highest quantity of high priority requests, the first priority comprising a higher priority relative to the second priority and the second priority comprising a higher priority relative to the third priority, and
sending each request, of the set of requests, to the identified memory bank, associated with each request during a single clock cycle.

16. The method of claim 15, where a position of at least one of the first bit or the second bit is programmable.

17. The method of claim 15, where identifying, for each request, of the plurality of requests, the memory bank, of the plurality of memory banks, includes:
using a set of low order bits of the address in the second address space to determine the memory bank, the set of low order bits including the first bit.

18. The method of claim 15, where performing, for each request, of the plurality of requests, the mapping operation includes:
swapping a set of high order bits of the address with a set of low order bits of the address.

19. The method of claim 18, where a position of at least one of the set of high order bits or the set of low order bits is programmable.

20. The method of claim 15, where identifying, for each request, of the plurality of requests, the memory bank, of the plurality of memory banks, includes:
using a set of low order bits of the address in the second address space to determine the memory bank.

* * * * *